Patented Nov. 9, 1937

2,098,590

UNITED STATES PATENT OFFICE 2,098,590

VAT DYESTUFFS OF THE ANTHRAQUINONE SERIES

Paul Nawiasky, Alfred Ehrhardt, and Karl Saftien, Ludwigshafen-on-the-Rhine, Germany, assignors to General Aniline Works, Inc., New York, N. Y., a corporation of Delaware No Drawing. Application November 2, 1935, Serial No. 48,048. In Germany November 3, 1934

5 Claims. (Cl. 260—40)

The present invention relates to vat dyestuffs of the anthraquinone series and a process of producing same.

We have found that carboxylic acids which are derived from 1(N).2-pyridonoanthraquinones can be converted into valuable vat dyestuffs by causing the said acids, preferably in the form of their halides, or their derivatives containing halogen to react with aromatic amino compounds containing at least one cyclic bound keto group.

For example monocarboxylic and polycarboxylic acids of the said kind which may contain alkyl or aryl groups attached to nitrogen or also to carbon may be employed. The carboxylic groups may be attached to the pyridonoanthraquinone nucleus and/or to any aryl radicles present. When the amino compounds used contain a hydroxyl, mercapto or further amino group in ortho position to the amino group, carboxylic amides may also be obtained or the corresponding azoles by the splitting off of water. The new dyestuffs have very good fastness properties.

The following examples will further illustrate how the said invention may be carried out in practice but the invention is not restricted to these examples. The parts are by weight.

Example 1

A mixture of 1.1 parts of the chloride of 1(N).2-pyridonoanthraquinone -Py3- carboxlylic acid (obtainable for example by saponification of the 1(N).2 - pyridonoanthraquinone - Py3 - carboxylic nitrile obtainable according to Example 3 of the application Ser. No. 38,208 by reacting 1-aminoanthraquinone-2-aldehyde with cyanoacetic acid ethyl ester in the presence of pyridine with sulfuric acid and treatment of the 1(N).2-pyridonoanthraquinone-Py3-carboxylic acid with thionyl chloride in nitrobenzene), 0.7 part of 1-aminoanthraquinone and 30 parts of nitrobenzene is heated at 180° C. until hydrogen chloride no longer escapes. The dyestuff formed is filtered off by suction at about 100° C. and washed with a little hot nitrobenzene. It dissolves in concentrated sulfuric acid giving a yellow coloration and dyes cotton from a brown vat powerful yellow shades.

If 2-aminoanthraquinone be employed instead of 1-aminoanthraquinone, a dyestuff is also obtained which gives powerful yellow dyeings.

Example 2

1.1 parts of the chloride specified in Example 1 are reacted with 1.2 parts of 1-amino-4-benzoyl-aminoanthraquinone in the manner described in Example 1. The resulting dyestuff dissolves in concentrated sulfuric acid giving a red coloration and dyes cotton powerful orange shades from a brown-black vat.

If 1-amino-5-benzoylaminoanthraquinone be employed instead of 1-amino-4-benzoylaminoanthraquinone, a dyestuff is obtained which gives powerful yellow dyeings.

Example 3

A mixture of 3.4 parts of the chloride specified in Example 1 and 1.2 parts of 1.4-diaminoanthraquinone is caused to react in the manner described in Example 1. The dyestuff thus obtained dissolves in concentrated sulfuric acid giving a brown coloration and dyes cotton powerful reddish yellow shades from a brown-black vat.

If 1.5-diaminoanthraquinone be employed instead of 1.4-diaminoanthraquinone, a dyestuff giving powerful yellow dyeings is obtained.

Example 4

A mixture of 3.4 parts of the chloride specified in Example 1 and 1.35 parts of para-diaminoanthrarufin is treated in the manner described in Example 1. A dyestuff is thus obtained which dissolves in concentrated sulfuric acid giving a brown coloration which changes to green after standing. It dyes cotton powerful reddish brown shades from a brown-black vat.

Example 5

A mixture of 3.4 parts of the chloride specified in Example 1 and 2.6 parts of 2-amino-3-mercaptoanthraquinone is introduced into 75 parts of nitrobenzene heated to 180° C. As soon as hydrogen chloride is no longer evolved the dyestuff formed is filtered off at 100° C. It dissolves in concentrated sulfuric acid giving a yellow coloration and dyes cotton powerful reddish yellow shades from a brown vat.

Example 6

A mixture of 1.7 parts of the chloride specified in Example 1 and 1.2 parts of 2-amino-3-hydroxyanthraquinone is treated in the manner described in Example 1. The compound thus formed is introduced at from 100° to 110° C. into twenty times its amount of concentrated sulfuric acid and kept at the said temperature for about an hour. A dyestuff is thus obtained which dyes cotton powerful yellow shades from an olive-green vat.

Example 7

3.4 parts of the chloride described in Example 1 are reacted in the manner therein described with 2.7 parts of 4-amino-1.9-anthrapyrimidine. A dyestuff is obtained which dyes cotton powerful yellow shades.

When employing 5-amino-1.9-anthrapyrimidine, a dyestuff which also gives powerful yellow shades is obtained.

Example 8

3.4 parts of the chloride specified in Example 1 are caused to react as described therein with 2.4 parts of 1.2-diamino-anthraquinone. A dyestuff is obtained which dissolves in concentrated sulfuric acid giving a brown coloration. It dyes cotton powerful orange shades from a brown-black vat.

Example 9

A mixture of 1 part of 1(N).2-pyridonoanthraquinone-3-carboxylic acid chloride (obtainable by the treatment of 1-acetylamino-3-methylanthraquinone-2-aldehyde with potassium acetate in the presence of trichlorbenzene, oxidation of the resulting 3-methyl-1(N).2-pyridonoanthraquinone to form the carboxylic acid and reaction with thionyl chloride), 0.68 part of 1-aminoanthraquinone and 30 parts of nitrobenzene is heated at 180° C. until hydrogen chloride no longer escapes. The whole is then allowed to cool to 100° C. and the resulting dyestuff is filtered off by suction. It dyes cotton yellow shades from a red vat.

If 1-amino-5-benzoylaminoanthraquinone be employed instead of 1-aminoanthraquinone, a dyestuff is obtained which yields reddish yellow dyeings.

Example 10

A mixture of 1.75 parts of N-methyl-1(N).2-pyridonoanthraquinone-Py3-carboxylic acid chloride (obtainable by saponifying the ester obtainable according to Example 8 of the application Ser. No. 38,208 by reacting 1-methylaminoanthraquinone-2-aldehyde with diethyl malonate in the presence of pyridine with sulfuric acid and treating the resulting carboxylic acid with thionyl chloride), 1.3 parts of 1-aminoanthraquinone and 40 parts of nitrobenzene is heated at 160° C. until hydrogen chloride no longer escapes. The mixture is then allowed to cool to 100° C. and the dyestuff filtered off. It yields yellow shades of color on cotton from a red-brown vat.

If 1-amino-5-benzoylaminoanthraquinone be employed instead of 1-aminoanthraquinone, a dyestuff is obtained which yields reddish yellow dyeings; with 1-amino-4-benzoylaminoanthraquinone a dyestuff giving orange dyeings and with 1.5-diaminoanthraquinone a dyestuff giving yellow dyeings is obtained.

Example 11

A mixture of 1.75 parts of N-methyl-1(N).2-pyridonoanthraquinone-Py3-carboxylic acid chloride, 1.3 parts of 2-amino-3-hydroxyanthraquinone and 40 parts of nitrobenzene is heated to boiling until hydrogen chloride no longer escapes. The mixture is then allowed to cool to 100° C. and the compound formed is filtered off by suction, washed with benzene and ethanol, dried and introduced at 100° C. and 20 times its weight of concentrated sulfuric acid. A dyestuff is thus obtained which dyes cotton powerful yellow shades from a rod-brown vat.

Example 12

A mixture of 64 parts of the chloride of Py4-(para-tolyl)-1(N).2-pyridonoanthraquinone-Py3-carboxylic acid (obtainable for example by saponifying the ethyl ester of this acid obtainable according to Example 6 of the said application Ser. No. 38,208 by reacting 1-amino-2-(4'-methylbenzoyl)-anthraquinone with diethyl malonate in the presence of trichlorbenzene and potassium acetate with alcoholic caustic potash and treating the resulting carboxylic acid with thionyl chloride in nitrobenzene), 55 parts of 1-amino-5-benzoylaminanthraquinone and 850 parts of nitrobenzene is heated for three hours at 160° C. After cooling, the dyestuff formed is filtered off by suction and washed with a little cold nitrobenzene. It dissolves in concentrated sulfuric acid giving a red-yellow coloration and dyes cotton powerful yellow dyeings.

Example 13

A mixture of 60 parts of the chloride of N-methyl-Py4-phenyl-1(N).2-pyridonoanthraquinone-Py3-carboxylic acid (obtainable for example by saponifying the ester of the said acid obtainable according to Example 9 of the said application Ser. No. 38,208 by reacting 1-methylamino-2-benzoylanthraquinone with diethyl malonate, with alcoholic caustic potash and treatment of the acid with thionyl chloride in nitrobenzene), 50 parts of 1-amino-5-benzoylaminoanthraquinone and 800 parts of nitrobenzene is heated for four hours at 160° C. After cooling, the dyestuff formed is filtered off by suction and washed with a little nitrobenzene.

It dissolves in concentrated sulfuric acid giving a red-brown coloration and dyes cotton powerful yellow shades from a red-violet vat.

A dyestuff which also dyes powerful yellow shades is obtained by employing 1-aminoanthraquinone instead of 1-amino-5-benzoylaminoanthraquinone.

Example 14

A mixture of 66 parts of the chloride of Py4-(para-carboxyphenyl)-1(N).2-pyridonanthraquinone (obtainable for example by oxidizing the Py4-(para-tolyl)-1(N).2-pyridonoanthraquinone obtainable according to Example 7 of the said application Ser. No. 38,208 by heating 1-acetylamino-2-(para-tolyl)-anthraquinone in the presence of trichlorbenzene and potassium acetate, with sodium bichromate in sulfuric acid solution and treating the resulting carboxylic acid with thionyl chloride in the presence of nitrobenzene), 50 parts of 1-aminoanthraquinone and 1250 parts of nitrobenzene is heated for four hours at 160° C. The dyestuff thus formed is filtered off by suction at 100° C. and washed with a little nitrobenzene. It dissolves in concentrated sulfuric acid giving a yellow coloration and dyes cotton powerful yellow shades from a red-brown vat.

If 1-amino-5-benzoylaminoanthraquinone or 1.5-diaminoanthraquinone be employed instead of 1-aminoanthraquinone, dyestuffs yielding powerful yellow dyeings are also obtained.

Example 15

A mixture of 6 parts of the chloride of N-methyl-Py4-(para-carboxyphenyl)-1(N).2-pyridonoanthraquinone (prepared for example by the reaction of the carboxylic acid obtainable according to Example 10 of the said application Ser. No. 38,208 by heating the acetyl compound of 1-methylamino-2-(para-carboxybenzoyl)-anthraquinone in the presence of aqueous ethanol and sodium hydroxide, with thionyl chloride in the presence of nitrobenzene), 4.1 parts of 1-aminoanthraquinone and 165 parts of nitrobenzene is treated in the manner described in Example 14. A dyestuff is obtained which dissolves in concentrated sulfuric acid giving a yellow coloration and which dyes cotton powerful yellow shades from a violet vat.

By employing 1-amino-5-benzoylaminoanthraquinone, a dyestuff which also yields powerful yellow dyeings is obtained.

Example 16

A mixture of 4.8 parts of the chloride of N-methyl - Py4-(para-carboxyphenyl) - 1(N).2-pyridonoanthraquinone-Py3-carboxylic acid (prepared for example by saponification of the monocarboxylic acid ester obtainable according to Example 11 of the said application Ser. No. 38,208 by reacting 1-methyl-amino-2-(para-carboxybenzoyl)-anthraquinone with diethyl malonate, with alcoholic caustic potash and treating the resulting dicarboxylic acid with thionyl chloride), 7.5 parts of 1-amino-5-benzoylaminoanthraquinone and 80 parts of nitrobenzene is treated in the manner described in Example 14. The dyestuff obtained dissolves in concentrated sulfuric acid giving a red coloration and dyes cotton powerful yellow shades from a violet vat.

A dyestuff which also gives powerful yellow dyeings is also obtained by employing 1-aminoanthraquinone instead of 1-amino-5-benzoylaminoanthraquinone.

Example 17

A mixture of 40 parts of the acid chloride of Py4-(2'.4' - dicarboxyphenyl) - 1(N).2 - pyridonoanthraquinone (prepared for example by oxidizing the Py4-(2'.4'-dimethylphenyl)-(N).2-pyridonoanthraquinone obtainable according to Example 7 of the said application Ser. No. 38,208 by heating 1-acetylamino - 2 - (2'.4'-dimethylbenzoyl)-anthraquinone in the present of trichlorbenzene and potassium acetate, with sodium bichromate in sulfuric acid solution and treating the dicarboxylic acid thus obtained with thionyl chloride in the presence of nitrobenzene), 71 parts of 1-amino-5-benzoylaminoanthraquinone and 1200 parts of nitrobenzene is treated in the manner described in Example 14. The resulting dyestuff dissolves in concentrated sulfuric acid giving a red-yellow coloration and dyes cotton powerful yellow shades from a red-brown vat.

Example 18

A mixture of 30 parts of the chloride of the 4-chlor - N - methyl-Py4-phenyl-1(N)-2- pyridonoanthraquinone-Py3-carboxylic acid (obtainable by saponification of the ester of the said acid obtainable according to Example 12 of the said application Ser. No. 38,208 by reacting 1-methyl-amino-2-benzoyl-4-chloranthraquinone with diethyl malonate, with alcoholic potassium hydroxide solution and treating the carboxylic acid thus obtained with thionyl chloride in the presence of monochlorbenzene), 25 parts of 1-amino-5-benzoylaminoanthraquinone and 360 parts of nitrobenzene is heated at about 160° C. for three hours. After cooling, the dyestuff formed is filtered off by suction and washed with cold nitrobenzene. It dissolves in concentrated sulfuric acid giving a brown-red coloration and dyes cotton yellow shades from a blue-red vat.

Example 19

A mixture of 45 parts of the chloride of N - (para - carboxyphenyl) - Py4 - (para-methylphenyl)-1(N).2-pyridonoanthraquinone (obtainable by treating the carboxylic acid obtainable according to Example 13 of the said application Ser. No. 38,208 by treating the acetyl compound of 1-(para - carboxyphenylamino) - 2 - (para-methylbenzoyl)-anthraquinone with caustic potash in the presence of anhydrous ethanol, with thionyl chloride in the presence of nitrobenzene), 34 parts of 1-amino-5-benzoylaminoanthraquinone and 1200 parts of nitrobenzene is heated for three hours at about 160° C. After cooling to 120° C. the dyestuff separated is filtered off by suction. It dissolves in concentrated sulfuric acid giving a yellow-red coloration and dyes cotton yellow shades from a wine-red vat.

Example 20

A mixture of 5 parts of the chloride of the Py4-methyl-1(N)-2-pyridonoanthraquinone-Py3-carboxylic acid (obtainable by saponification of the ethyl ester of this acid which can be prepared by condensing 1-amino-2-acetylanthraquinone with diethyl malonate, with 78 per cent sulfuric acid at 130° C. and treating the said acid with thionyl chloride in the presence of nitrobenzene), 5 parts of 1-amino-5-benzolylaminoanthraquinone and 240 parts of nitrobenzene are heated for three hours at about 160° C. After cooling to 120° C., the dyestuff formed is filtered off by suction and washed with cold nitrobenzene. It dissolves in concentrated sulfuric acid giving a yellow coloration and dyes cotton powerful yellow shades from a red vat.

What we claim is:

1. Vat dyestuffs of the anthraquinone series corresponding to the general formula

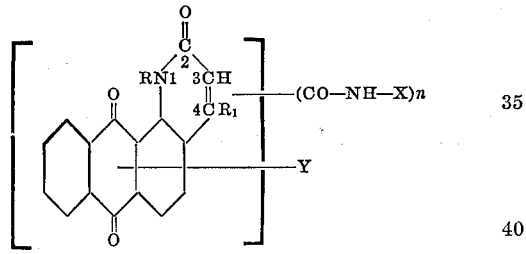

wherein R and R₁ stand for a member selected from the class consisting of hydrogen, the alkyl groups and the aryl groups of the benzene series, X for an aryl group of the anthraquinone series, and $n$ for a whole number up to 2, and wherein Y stands for a member selected from the class consisting of hydrogen and halogen.

2. Vat dyestuffs of the anthraquinone series corresponding to the general formula

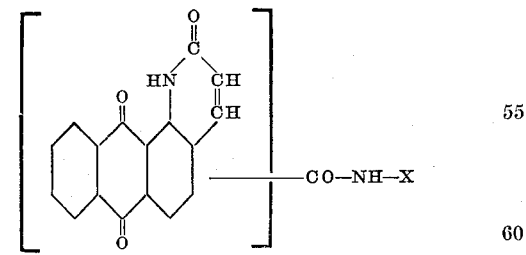

wherein X stands for a radical of the anthraquinone series.

3. The vat dyestuff of the anthraquinone series having the formula

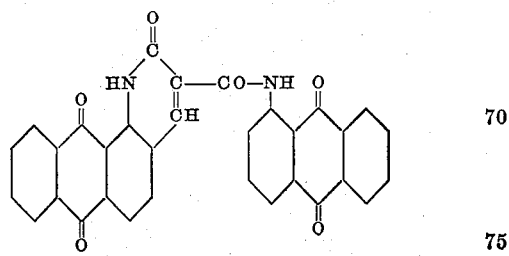

4. The vat dyestuff of the anthraquinone series having the formula
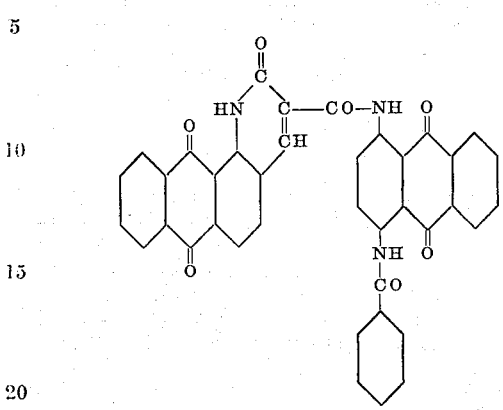
5. The vat dyestuff of the anthraquinone series having the formula
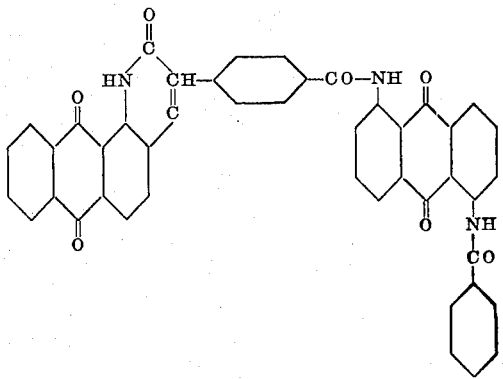
PAUL NAWIASKY.
ALFRED EHRHARDT.
KARL SAFTIEN.